No. 860,434. PATENTED JULY 16, 1907.
J. W. ANDERSON.
HYDRAULIC CONTROLLER FOR VEHICLES.
APPLICATION FILED AUG. 29, 1906.
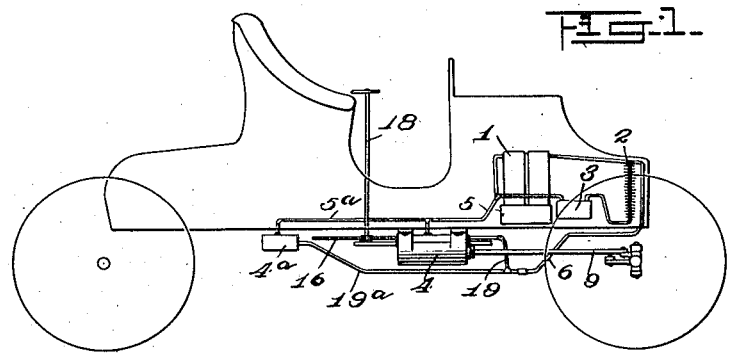
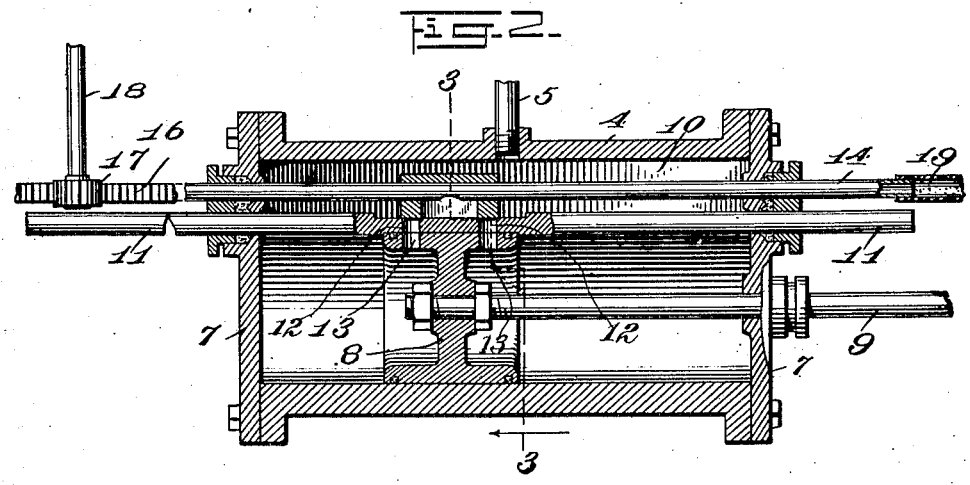
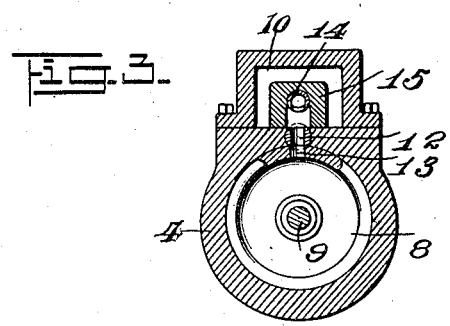
WITNESSES
INVENTOR
John W. Anderson
BY
ATTORNEYS

UNITED STATES PATENT OFFICE.

JOHN WESLEY ANDERSON, OF WEED, CALIFORNIA, ASSIGNOR OF ONE-HALF TO GEORGE W. BURK, OF SISSON, CALIFORNIA.

HYDRAULIC CONTROLLER FOR VEHICLES.

No. 860,434.      Specification of Letters Patent.      Patented July 16, 1907.

Application filed August 29, 1906. Serial No. 332,468.

*To all whom it may concern:*

Be it known that I, JOHN WESLEY ANDERSON, a citizen of the United States, and a resident of Weed, in the county of Siskiyou and State of California, have invented a new and Improved Hydraulic Controller for Vehicles, of which the following is a full, clear, and exact description.

This invention relates to a new and improved means for controlling motor vehicles, and comprises a hydraulic cylinder operated by water or other liquid under pressure, and preferably by a portion of the water normally used for circulating around the gas engine or condensing the steam on an automobile if a gas engine or a steam engine be employed.

In my improved hydraulic controller there is provided a hand-operated valve upon the operation of which the piston of the cylinder will move a given distance and automatically close the ports and retain its position until the valve is again moved to uncover the ports and permit of further movement of the piston, the movement of the piston being in the same direction as the movement of the valve.

Reference is to be had to the accompanying drawings forming a part of this specification, in which similar characters of reference indicate corresponding parts in all the figures, in which Figure 1 is a side elevation of certain parts of an automobile provided with my improved controller; Fig. 2 is a longitudinal section through the hydraulic cylinder; and Fig. 3 is a cross section on the line 3—3 of Fig. 2.

In the drawings I have indicated an automobile having an engine 1, a radiator 2 and a pump 3, operated in any suitable manner and adapted to circulate water or other liquid through the jacket of the engine and through the radiator. Beneath the body of the car is located the hydraulic cylinder 4, communicating with the discharge port of the water circulating pump by a pipe 5 and having the exhaust from said hydraulic cylinder communicating with the return pipe of the main water circulating system through a pipe 6.

In the particular form of my invention which is illustrated in the drawings, I have employed a controller for operating the steering mechanism of the machine, although I do not desire to be limited to this particular application of the controller as it is evident that not only the steering mechanism but also the brakes and many other parts of the machine may be controlled by my improved device.

The controlling cylinder 4 is provided with heads 7, a piston 8 and piston rod 9, all of common construction. The upper side of the cylinder is provided with a slot or groove throughout its entire length, and upon this slot or groove is a second chamber 10 in open communication with the water supply pipe 5. Exactly fitting the slot or passage between the chamber 10 and the main cylinder, there is provided a longitudinally-movable port rod 11, having its ends extending out through packings in the heads of the cylinder. This rod 11 has two ports or passages 12, extending transversely through the same and by which the chamber 10 may communicate with the cylinder. The side of the port rod which is toward the cylinder is slightly cut away to exactly fit the piston 8 and the flanges of the piston are provided with two ports 13 in alinement with the ports 12 of the port rod. By reason of the cut-away portion of the port rod 11, any movement of the piston will cause a simultaneous movement of the port rod, so that the ports 12 of the port rod and the ports 13 of the piston are always in alinement.

Mounted just above the port rod 11 and in the chamber 10, parallel to the said port rod, is a combined valve operating rod and discharge pipe 14. This pipe is mounted to freely reciprocate through the chamber 10 and carries with it a common form of sliding cut-off valve 15, having its lower side open toward the port rod 11 and having its inner chamber of a length substantially equal to the distance between the two ports in the port rod. One end of the rod 14 is hollow and the passage through it communicated with the interior chamber of the valve 15. The opposite end of the rod 14 is closed and is provided with any suitable means for reciprocating the rod and its valve, as, for instance, a rack 16 meshing with a pinion 17 on the steering rod 18. The piston rod 9 extends forward to the front end of the machine and is connected in any suitable manner to the front axle or front wheels for changing their direction and thus steering the machine.

When it is desired to change the direction of the machine, the steering rod 18 is turned to move the valve rod 14 and upon the movement of this rod and the valve, water entering the pipe 5 will pass from the chamber 10 through the ports 12 and 13 to one side of the piston and cause the piston and port rod to move in the same direction as the valve itself was moved. Meanwhile, the water on the opposite side of the piston has been flowing through the second ports 12 and 13 into the chamber within the valve 15 and from there out through the pipe 14. As soon as the piston and the port rod have moved to a position directly beneath the valve, both pairs of ports 12 and 13 will be closed by the valve and the piston will thus effectually be locked in position. By the movement of the piston rod 9 the direction of the machine has been varied the required amount, and when it is desired to again change the direction of the machine the valve may be moved in the opposite direction and the piston and port rod will immediately follow and stop in a position directly below the valve.

In large machines it often requires a considerable amount of energy to steer the machine particularly in soft or muddy ground, but with my improved controller it requires practically no energy to move the small valve rod and the work of steering the machine is accomplished entirely by the pressure of water in the hydraulic cylinder.

The port rod is preferably cut away at its upper side to lie flush with the floor of the chamber 10, as indicated in Fig. 3, so that the lower side of the valve will fit the port rod and avoid any leakage into the cylinder when the valve is closed, and the piston may be provided with any suitable form of packing to prevent the water from passing from one side of the piston to the other. The pipe 14 is preferably connected to the return water pipe by means of a flexible connection 19, so that the rod 14 may freely reciprocate and the water may be returned to the cistern adjacent the inlet to the pump or at any other point on the return side of the water circulating system. If desired, the rod may terminate at the valve and have only one end thereof extending through packing boxes in the chamber 10, as it is evident that the same end on which the operating means are provided also may be made hollow and serve as the discharge passage from the cylinder.

In Fig. 1 I have illustrated the pipe 5 as having a branch 5$^x$, extending to a second cylinder 4$^a$ and having a return pipe 19$^a$ communicating with the return pipe 19 of the cylinder 4. The cylinder 4$^a$ is only diagrammatically shown as the working parts thereof are identical with the parts of the cylinder 4. This second cylinder 4$^a$ may be employed for operating the brakes of the machine and has its valve rod connected to the brake lever. By operating the brakes by a hydraulic cylinder, it is evident that any amount of pressure may be applied, the amount depending not upon the strength exerted upon the brake lever, but only upon the extent to which that lever is applied and the amount of water admitted behind the piston.

If desired, this improved hydraulic controller may be employed on vehicles which do not normally have a water circulating system, as it is evident that a water circulating pump and the necessary piping may be provided for any suitable form of vehicle.

Various changes may be made in the particular form of the cylinder and its controlling parts and it is evident that they may be put to various other uses than any above enumerated, but all such minor changes and different uses would fall within the scope of my invention.

Having thus described my invention, I claim as new and desire to secure by Letters Patent:

1. In combination, a cylinder, a piston movable therein, a port rod carried by said piston, and a valve in engagement with said port rod and movable in relation thereto.

2. In combination, a cylinder having a groove or slot extending throughout its entire length, a port rod movable in said groove or slot and provided with two passages communicating with the cylinder, a valve controlling said passages, and a hollow rod connected to said valve and movable therewith.

3. In combination, a hydraulic cylinder, a piston movable therein, a port rod extending along one side of the cylinder and adapted to be moved by the piston, and a casing mounted on said cylinder and communicating therewith through ports in the port rod and piston.

4. In combination a cylinder, a piston mounted therein, a casing forming a chamber along one side of the cylinder, a slot in the wall of the cylinder extending throughout its entire length and by which it communicates with said chamber, a port rod normally closing said slot and longitudinally-movable therein, and a valve mounted in said chamber and in engagement with said port rod.

5. In combination, a cylinder having a piston movable therein, a casing mounted on said cylinder and forming a chamber, the wall between said cylinder and said chamber being provided with a slot extending its entire length, a port rod carried by the piston and longitudinally-movable in said slot, said port being provided with two transverse ports in alinement with two similar ports in the piston, a valve in said chamber and in engagement with said port rod, a hollow rod connected to said valve and extending to the outside of the chamber, and means for moving said valve whereby the hollow rod may communicate with the cylinder through the valve and ports in the port rod and piston.

6. In combination, a cylinder, a piston movable therein, a valve controlling the admission of a motive fluid to said piston, and means for moving the piston in the same direction as the valve and to the same extent.

7. In combination, a cylinder having a piston movable therein, flanges on said piston, said flanges having ports communicating with the cylinder on opposite sides of said piston, means carried by said piston and provided with ports in alinement with the ports of the piston, and a valve for controlling said last mentioned ports.

8. In combination, a cylinder having a piston movable therein, an admission valve, and a valve seat movable longitudinally of the cylinder and adapted to control the movement of the piston.

9. In combination, a cylinder, a piston movable therein and having ports located therein, a valve seat having ports corresponding to the ports of the piston and movable longitudinally of the piston, and a valve controlling the ports of the valve seat, whereby the position of the piston in the cylinder may be controlled by the movement of the valve in the valve seat.

In testimony whereof I have signed my name to this specification in the presence of two subscribing witnesses.

JOHN WESLEY ANDERSON.

Witnesses:
JAMES ANDREW TAYLOR.
E. J. LAWLESS.